March 10, 1936. E. S. CORNELL, JR 2,033,122
METHOD OF SWEAT FITTING
Filed Sept. 23, 1933
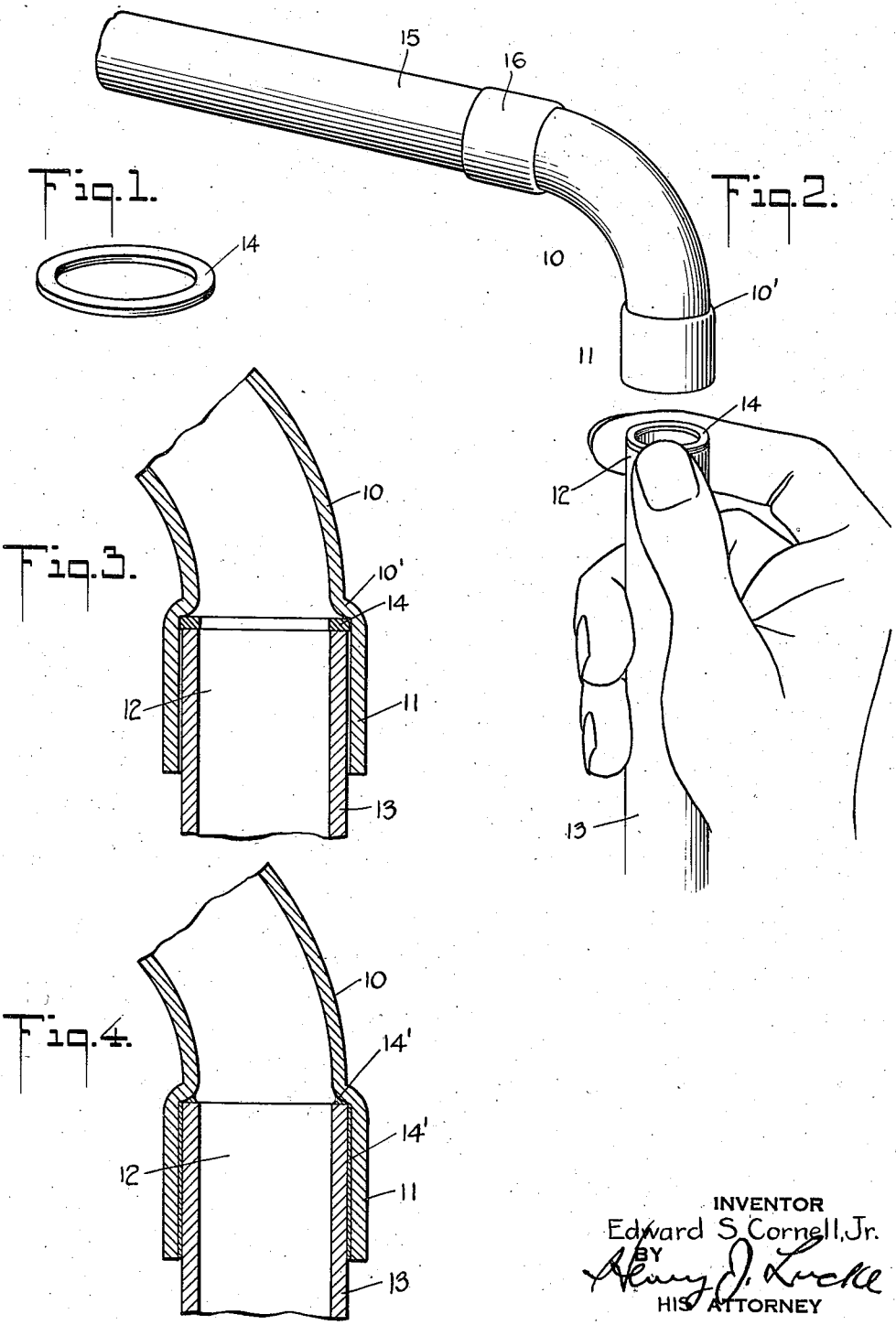
INVENTOR
Edward S. Cornell, Jr.
BY
HIS ATTORNEY Patented Mar. 10, 1936

2,033,122

UNITED STATES PATENT OFFICE 2,033,122

METHOD OF SWEAT FITTING

Edward S. Cornell, Jr., Larchmont, N. Y., assignor to American Radiator Company, New York, N. Y., a corporation of New Jersey Application September 23, 1933, Serial No. 690,748

2 Claims. (Cl. 113—112)

My invention relates to an improved method of sweat-jointing pipe fittings to the ends of pipes or other pipe fittings.

Pipe fittings essentially of copper or high copper content metals are set forth and claimed in several of my co-pending applications, referred to more particularly hereinafter, and also in my U. S. Patent #1,850,049, patented March 15, 1932.

Pursuant to the procedure generally described in my said co-pending application and my said granted patent, the jointing of interconnected pipe fittings and/or ends of pipes or other pipe fittings is had by sweated telescoped or overlapping connection, the internal diameter of the inner face of each female joint member being smooth and of substantially uniform diameter throughout, and preferably also imperforate, the outer face of the end of the pipe or other pipe fitting serving as the male member of the joint being also smooth and of substantially uniform diameter throughout, the diameter of the inner face of the female member and the diameter of the outer face of the male member being related to one another to provide for a clearance of a magnitude to effect capillary and/or surface flow of a suitable bonding medium while in the status of fluidity, had conveniently by preheating the male and female members, the bonding medium congealing upon cooling, to provide a sealed and rigid joint under all conditions of use of the resulting piping system.

Further, I provide definite stops for predetermining the extent of overlap of the female member relative to the male member, to thereby insure a proper area of bonding between the stated faces of the male and female members by the congealed bonding medium.

Such limiting stop, pursuant to preferred forms of my invention, may be had by outward bulging of the material of the body of the fitting directly proximate to the end portion serving as the female member of the resulting joint, the bulging being had by integrally expanding the material of the end portion, and preferably in extent of increased radius of the expanded end relative to the radius of the body of the fitting substantially equal to the wall thickness of the end of the pipe or other pipe fitting serving as the male member of the joint, whereby upon completion of the joint a substantially clear bore, that is to say, substantially uniform diameter is provided for the full flow of the fluid through the joint and connected members.

A particular step of my present invention lies in the provision of the bonding medium, preferably an alloy of metallic constituency, in the form of an annulus having an outer diameter sufficiently less relative to the inner diameter of the female member to permit ready insertion therewithin, and of a mass, determined by the inner diameter of the annulus, and/or its thickness, to provide the proper—and predetermined—quantity of the bonding medium, and particularly to avoid excess, whereby to realize complete distribution of the bonding medium about and between the mutually engaging faces of the female and male members of the joint and to maintain the clear bore therethrough.

Further features and objects of the invention will be more fully understood from the following detail description and the accompanying drawing, in which Fig. 1 is a perspective view of a flat type of annulus employed in carrying out my method;

Fig. 2 indicates a manner of carrying out a preliminary step of my method, illustrated in the jointing of an end of a pipe to a female end of an elbow;

Fig. 3 is a detail central sectional view, on an enlarged scale, subsequent to that of Fig. 2, showing the inserted annulus of bonding medium positioned preparatory for the final step of the process; and Fig. 4 is a view similar to Fig. 3 showing the completion of the joint pursuant to my method.

My method is illustrated in the drawing in its application to an overlapping joint between an elbow and the end of a pipe; obviously, however, my invention is likewise applicable to all forms of telescoped sweated joints.

Referring to the drawing, the illustrated elbow 10 has an enlarged end 11 with which the end 12 of the indicated pipe length 13 is to be sweat jointed.

The proper "size" of solder annulus 14 is selected for the particular size of the elbow 10 and pipe 13; desirably, the "size" number of the annulus for the trade corresponds to the "size" number of the correlated parts, i. e. elbows, reducers, T's, couplings, etc., and the pipes, tubes, etc.

Such proper annulus 14 is placed upon the end face of the end portion 12 of the pipe 13 and thus inserted into the female end 11 of the elbow 10, see Fig. 3.

As is apparent, such manner of insertion of the solder annulus is of especial advantage in making a joint with a female member positioned to extend downwardly.

The required step of heating to fuse the solder annulus 14 may take place either by heating the enlarged end 11 in advance of or while inserting the pipe end 12 and supported annulus 14, or after the insertion of the same.

As indicated above, the mass or quantity of the solder embodied in the annulus is predetermined to amply but not excessively thoroughly coat the inner face of the female member, in this illustrated instance, the enlarged end 11, and the outer face of the end portion 12 of the pipe 13. The congealed bonding medium is indicated 14' in Fig. 4.

The stop formation, see 10', resulting from the enlarging of the end 11, is selectively located to provide an area of the inner face of the enlarged end 11 which insures a mechanically rigid joint of the assembled parts, as well as a dependable seal against liquid and/or gas leakage.

The distribution of the fused solder is enhanced by previous cleansing of the inner and outer faces of the female and male members, to remove grease, dirt and other foreign matter, as by application of steel wool or equivalent treatment, also by rotating the male and female members relative to one another during the stage of flow of the solder.

As previously referred to, the increased radius of the enlarged end 11, see Fig. 4, relative to the radius of the body of the elbow 10 corresponds substantially to the thickness of the wall of the pipe 13, whereby the resulting joint presents a bore substantially equal to that of the body 10 of the elbow, and of the pipe 13.

Desirably, the quantity of solder in the proper "size" of annulus is sufficient to provide the ultimately congealed mass portion, see 14', Fig. 4, remaining at and serving to substantially fill the clearance between the end face of the pipe end 12 and the expanding portion 10', integrally connecting the body of the elbow to the expanded end 11 of the elbow, in furtherance of the full flow, that is, clear bore through the sweated joint.

In Fig. 2 is illustrated a pipe or tube 15 "sweat" jointedly connected to the elbow 10 at the other enlarged end 16 of the elbow 10, which may be of different "size" as compared with the enlarged end 11; the supply of solder in the form of an annulus or equivalent of the proper "size" corresponding to the diameter of the pipe 15, and in turn to the inner diameter of the enlarged end 16, is had similarly as set forth in particular with respect to the sweat joint between the end 12 of the pipe 13 and the enlarged end 11 of the elbow 10.

From the above, it appears that my invention affords the supply of solder in the form of an annulus or other suitable configuration, preferably furnished to the trade as of stated "sizes", of predetermined mass, as the bonding medium. Each annulus or equivalent configuration, has an outer diameter suitable for the physical support or other manner of insertion of the annulus either upon the end of the pipe fitting, as instanced by the illustrated joint 11—12, or pushed in or like procedure, instances by the illustrated joint 15—16.

By my invention, the heating for effecting the "sweat" joint, is preferably applied to the outer, i. e. female, member of the joint, and thus in advance of the heating of the solder, per se; the stage at which the solder melts thus serves as a gauge for the extent of the complete heating of the joint. The instant of flow of the solder serves also as a time indication to the operator in avoidance of overheating.

As now appears, the outer dimension of the annulus or other perforated mass is advantageously greater than the inner diameter of the male member and less than the inner diameter of the female member, to facilitate insertion and location. The inner dimension of the annulus or equivalent may be such as desired. An inner diameter of an annulus not less than the inner diameter of the male member is advantageous, as is apparent. The outer, inner and facial contour of the annulus or equivalent may be varied as preferred.

If desired, the bonding medium in the form of an annulus or equivalent, and preferably of predetermined mass, may be inserted physically by any suitable tool, and the male member thereafter inserted into the female member, to dually locate the bonding medium in proper position during the stage of heating and eventually the male member relative to the female member during the stage of congealing of the bonding medium.

Optimum results are attained by properly applying pressure to position the male member to effect locating its inserted end face in immediate engagement with the stop afforded by the expanding web of the material of the fitting connecting the body with the expanded end, see expanding portion 10' of the illustrated elbow 10, thereby enhancing the rigidity of the resultant joint by such physical engagement, attaining the designed total area of the bonded contiguous faces, and securing unobstructed bore through the joint.

It will be observed that my method of application of the solder interiorly with respect to the female member is had by the use of pipe fittings and/or pipe ends which are imperforate and/or non-recessed at the joined faces, thus providing for complete integrality and full strength of material of both members of the joint, and also effecting the bonding of the contiguous faces of the jointed members continuously over such faces from end to end of the joint.

Whereas I have described my invention by reference to specific forms thereof, it will be understood that many changes and modifications may be made without departing from the spirit of the invention.

I claim.

1. The method of sweat joining a pipe fitting having an end portion enlarged as compared with the body of the fitting to an end of a pipe or another pipe fitting by means of a fusible medium which upon congealing effects the desired bonding between the inner face of the enlarged end portion serving as the female member with the contiguous outer face of the end of the pipe or another pipe fitting serving as the male member, the expanding web of the material of the female member connecting its body with its expanded end serving as a stop, which comprises supplying the bonding medium in the form of an annulus having an outer diameter less than the inner diameter of the female member and greater than the inner diameter of the male member and sufficient in quantity to effect the desired bonding only, inserting the male member within the female member, applying heat to fuse the bonding medium, then locating the male member in eventual relation to the female member and with the end thereof in engagement with the expanding web serving as a stop, and then congealing the bonding medium.

2. The method of sweat joining a pipe fitting having an end portion enlarged as compared with the body of the fitting to an end of a pipe or another pipe fitting by means of a fusible medium which upon congealing effects the desired bonding between the inner face of the enlarged end portion serving as the female member with the contiguous outer face of the end of the pipe or another pipe fitting serving as the male member, which comprises supplying the bonding medium in the form of a perforated mass having an outer dimension less than the inner diameter of the female member and greater than the inner diameter of the male member and predetermined in quantity to effect only the desired bonding of and between the stated contiguous faces, physically inserting the mass interiorly within the said female member by means of the stated male member, applying heat to jointly heat the stated female and male members and the interposed mass of bonding medium, and effecting the distribution of the bonding medium and the eventual positioning of the male member within the female member, and then congealing of the bonding medium.

EDWARD S. CORNELL, Jr.